H. A. RECEN.
MECHANICAL MOVEMENT.
APPLICATION FILED JAN. 14, 1922.

1,410,720.

Patented Mar. 28, 1922.

Inventor
Henry. A. Recen.
By A. J. O'Brien
Attorney

UNITED STATES PATENT OFFICE.

HENRY A. RECEN, OF KOKOMO, COLORADO.

MECHANICAL MOVEMENT.

1,410,720. Specification of Letters Patent. Patented Mar. 28, 1922.

Application filed January 14, 1922. Serial No. 529,252.

*To all whom it may concern:*

Be it known that I, HENRY A. RECEN, a citizen of the United States, residing at Kokomo, county of Summit, and State of Colorado, have invented certain new and useful Improvements in Mechanical Movements; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to mechanical movements, and has special reference to a combination and arrangement of parts which can be used in converting reciprocating motion into rotary motion, and vice versa.

The object of this invention is to produce mechanical movement that can be used in connection with a reciprocating engine, and which will result in a stronger structure in which the wear will be distributed in a better manner, and by means of which a stronger and more efficient engine is produced.

In order to more clearly describe my invention, I shall have reference to the accompanying drawing in which—

The same reference characters will be used to designate the same or similar parts throughout the several views.

Figure 1:
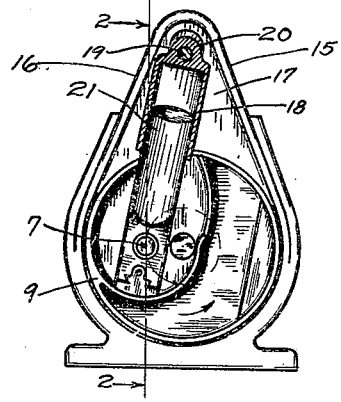
Fig. 1 is a longitudinal section taken on line 1—1, of Fig. 2.
Figure 3:
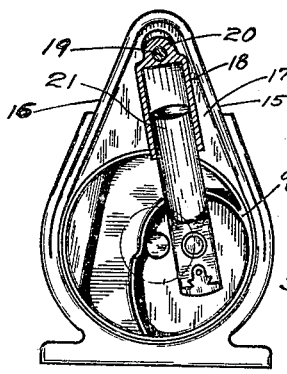
Fig. 3 is a view similar to Fig. 1, but showing the parts in the return or compression stroke.
Figure 2:
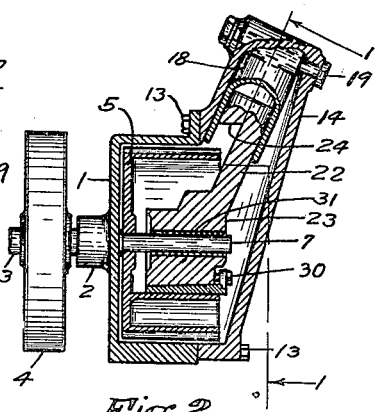
Fig. 2 is a section taken on line 2—2, Fig. 1.
Figures 4, 5:
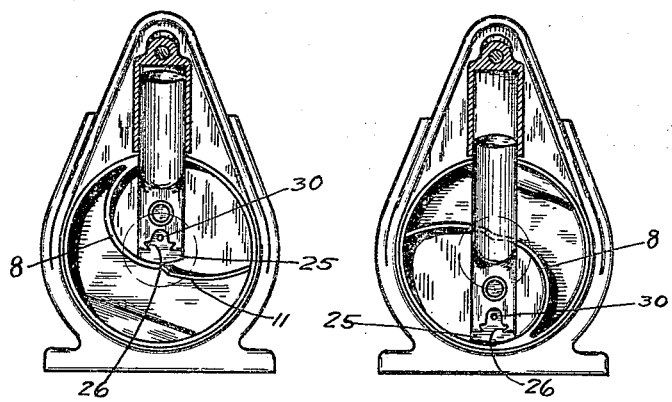
Fig. 4 is a section on line 1—1, Fig. 2, showing the parts in what may be termed "dead center" position.
Fig. 5 is a view similar to Fig. 4, but showing the parts in the position they occupy when the crank pin is 180 degrees from the position shown in Fig. 4.
Figures 6, 7:
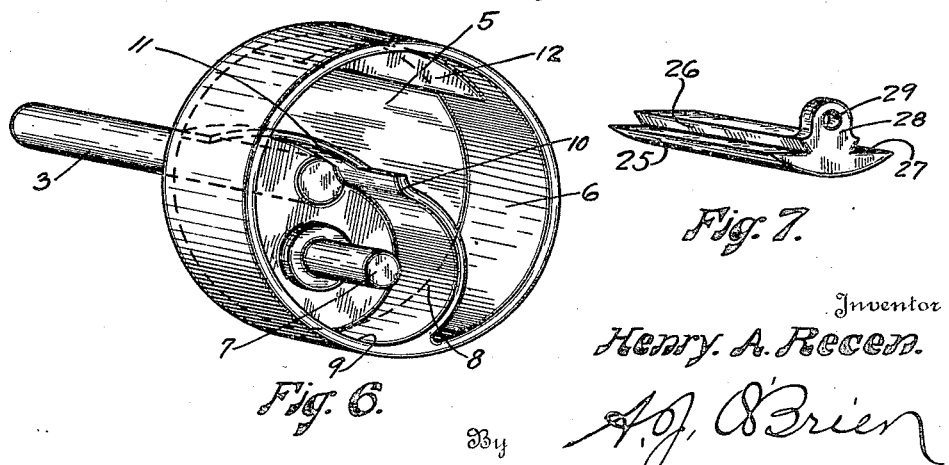
Fig. 6 is a perspective view of my improved crank disc.
Fig. 7 is a detail view showing the adjustable wearing member employed on the end of the piston rod.

Numeral 1 represents a cup-shaped housing of substantially circular cross section, and which is provided with a bearing 2 within which is rotatably mounted a shaft 3, on the outer end of which is secured a flywheel 4. Within the housing 1 and non-rotatably mounted on the inner end of shaft 3 is a crank disc 5, which is circular in shape and provided around its outer edge with a flange 6. On one side of the center, disc 5 is provided with a crank pin 7. Spaced from the crank pin 7 is an arcuate flange 8, one end of which merges into the flange 6 at point 9. From point 9 flange 8 extends about pin 7 for substantially 180 degrees to the point marked 10. At this point flange 8 makes a bend and extends by means of the curved portion 11 to the inner side of flange 6. Portion 11 is of less width than the part 8 and serves as a means for directing the flow of oil to the crank pin 7 and inner surface of flange 8. Directly opposite crank pin 7 is a counterbalance 12. Secured to housing 1 by means of bolts 13 is casing 14, whose sides 15 and 16 are upwardly convergent, thus providing a triangular compartment 17 within which is oscillatably mounted a cylinder 18. A pivot pin 19 passes through the walls of casing 14 and through an opening in the projecting part 20 in cylinder 18. Within the cylinder 18 is a piston 21 which has a downwardly extending portion 22 whose end 23 forms a bearing for the reception of and for cooperating with crank pin 7.

I have shown the downwardly extending portion 23 as an extension of the piston 21, and when so formed it will, of course, be necessary to cut a notch 24 in the side which faces the crank disc 5, in order that the flange 6 will not interfere with the reciprocation of the piston. The lower end of the bearing 23 is provided with a shoe 25, which is secured thereto by means of a dove-tail connection 26. Shoe 25 is inwardly tapering and the end of the bearing 23 which engages the surfaces 27 is so inclined that the outer surface of the shoe will be parallel with the inner surface of flange 8. In order to adjust shoe 25 with respect to the surface of flange 8, I provide it with an upstanding lug 28, which is provided with a hole 29 for the reception of screw 30. When the machine is new the parts are so adjusted that lug 28 is spaced a short distance from the side of bearing 23, and as the parts wear the screw 30 is rotated, thus moving the shoe inward and effecting the desired adjustment. When the parts operate as an engine and rotate in the direction of the arrow in Fig. 1, the thrust from the piston may be borne entirely by the crank pin 7, or if the shoe 25 is properly adjusted, some of the pressure may also be borne by the flange 8. It is evident that since the piston reciprocates in a line which makes an angle with the plane in which the crank disc 5 rotates, the bearing 23 will have a sliding as well as a rotary motion with respect to crank pin 7, and the shoe 25 will have a transverse as well as a longitudinal movement with respect to flange 8.

Lubricating oil is provided in the bottom of housing 1 in sufficient quantity to extend for some distance over the inside of flange 6, and as the crank disc 5 rotates, some of this oil will be engaged by flange 11 and carried up to flange 8, from which some of it will be thrown onto the crank pin 7, thus providing an effective lubrication. When the piston moves downwardly, the free space within the chamber 17 will, of course, be decreased by the amount of the piston displacement, and therefor the gases within this chamber will be slightly compressed. Gases from the piston chamber will also leak through into chamber 17 and thus raise the pressure therein. The pressure within chamber 17 will, of course, constitute a back pressure against which the piston must exercise work in its downward movement.

The bearing 23 may be provided with a removable bushing 31, which can be replaced when it becomes worn.

I have not shown any valves, either intake or exhaust, as it is not my intention in this application to go into details in regard to the construction of the entire engine, but rather to limit myself to describing the idea of having the direction of the piston reciprocation at an angle to the plane of rotation, whereby a sliding as well as a rotary motion is obtained between the crank pin and its bearing, and which enables me to provide a flange 8 which serves to protect the piston rod end from the effect of the pressure within the casing as the piston moves down, and of exposing the end of the piston rod to the effect of the pressure as the piston moves up. I also show a means for producing effective lubrication by means of the flanges 11 and 8 which scoop the oil up from the bottom of housing 1 and pour it over bearing 23 and on the contacting surfaces of shoe 25 and flange 8.

Having now described my invention, what I claim as new and desire to have protected by Letters Patent, is—

1. In combination, a support, a shaft rotatably mounted therein, a crank pin secured to said shaft, a piston adapted to reciprocate, means connected to said piston and rotatably connected to said crank pin, the direction of reciprocation of said piston forming an angle with the plane of rotation of said crank pin.

2. In combination, a support, a shaft rotatably mounted therein, a crank pin secured to said shaft, a piston adapted to reciprocate, means rigidly connected to said piston and rotatably connected to said crank pin, the direction of reciprocation of said piston forming an angle with the plane of rotation of said crank pin.

3. In a mechanism for converting reciprocating into rotary motion, in combination, a housing forming a support, a shaft rotatably mounted therein, a crank disc within said housing and non-rotatably secured to said shaft, a circular flange projecting outwardly from said disc near the outer periphery thereof, a crank pin secured to said disc, a cylinder attached to said housing, a piston reciprocably mounted with said cylinder, the axis of said cylinder and piston forming an angle with the plane of rotation of said disc, and means for connecting said piston to said crank pin.

4. In a mechanism for converting reciprocating into rotary motion, in combination, a housing forming a support, a shaft rotatably mounted therein, a crank disc within said housing and non-rotatably secured to said shaft, a circular flange projecting outwardly from said disc near the outer periphery thereof, a crank pin secured to said disc, a cylinder attached to said housing, a piston reciprocably mounted within said cylinder, the axis of said cylinder and piston forming an angle with the plane of rotation of said disc, and means for connecting said piston to said crank pin, said means comprising a rigid extension of said piston.

5. In a mechanism for converting reciprocating into rotary motion, in combination, a housing forming a support, a shaft rotatably mounted therein, a crank disc within said housing and non-rotatably secured to said shaft, a crank pin eccentrically mounted on said crank disc, an arcuate flange concentric with said crank pin and extending substantially 180 degrees about the same, a cylinder attached to said housing and adapted to oscillate, a piston reciprocably mounted within said cylinder, the axis of said piston and said cylinder being at an angle to the plane of rotation of said crank disc, means for connecting said piston and said crank pin, comprising a member rigidly connected to the piston and an adjustable shoe on the end of said connecting means for slidably engaging the inner surface of said flange during the inward movement of said piston.

6. In a mechanism for converting reciprocating into rotary motion, in combination, a housing forming a support, a shaft rotatably mounted therein, a crank disc within said housing and non-rotatably secured to said shaft, a crank pin eccentrically mounted on said crank disc, an arcuate flange concentric with said crank pin and extending substantially 180 degrees about the same, a cylinder attached to said housing and adapted to oscillate, a piston reciprocably mounted within said cylinder, the axis of said piston and said cylinder being at an angle to the plane of rotation of said crank disc, means for connecting said piston and said crank pin, comprising a member rigidly connected to the piston and an adjustable shoe on the end of said connecting means for slidably engaging the inner surface of said flange during the inward movement of said piston, means for adjusting said shoe, and an oil diverting flange forming an extension of said flange and terminating near the periphery of said disc.

7. In a mechanism for converting reciprocating into rotary motion, in combination, a housing forming a support, a shaft rotatably mounted therein, a crank disc within said housing and non-rotatably secured to said shaft, a flange extending entirely around one side of said disc near the periphery thereof, a crank pin eccentrically mounted on said crank disc, an arcuate flange concentric with said crank pin and extending substantially 180 degrees about the same, a cylinder attached to said housing and adapted to oscillate, a piston reciprocably mounted within said cylinder, the axis of said piston and said cylinder being at an angle to the plane of rotation of said crank disc, means for connecting said piston and said crank pin, comprising a member rigidly connected to the piston and an adjustable shoe on the end of said connecting means for slidably engaging the inner surface of said flange during the inward movement of said piston, means for adjusting said shoe, and an oil diverting flange forming an extension of said flange and terminating near the periphery of said disc.

8. In an engine having a crank shaft rotatably mounted in a support, a housing, a crank disc rotatable within said housing, a cylinder whose axis forms an angle with the plane of rotation of said crank disc, a piston reciprocably mounted in said cylinder, a crank pin on said disc, a connecting rod joining said piston and said crank pin, and means for shielding the end of said connecting rod from the gases within said housing as the piston moves inwardly, but exposing the same as the piston moves outwardly.

In testimony whereof I affix my signature.

HENRY A. RECEN.